United States Patent [19]

MacNeill

[11] 4,205,586
[45] Jun. 3, 1980

[54] LOCKING PIN

[76] Inventor: John H. MacNeill, 1320 S. Riverside Dr., Indialantic, Fla. 32903

[21] Appl. No.: 864,868

[22] Filed: Dec. 27, 1977

[51] Int. Cl.² .......................................... F16B 21/14
[52] U.S. Cl. ........................................................ 85/8.3
[58] Field of Search .......................... 85/8.1, 8.3, 8.9; 151/5, 6; 24/201 LP

[56] References Cited

U.S. PATENT DOCUMENTS

| 1,190,908 | 7/1916 | Kafader | 85/8.3 X |
| 1,799,934 | 4/1931 | Strid | 85/8.3 |
| 3,175,453 | 3/1965 | Williams | 85/8.3 |
| 3,263,552 | 8/1966 | Fischer | 85/8.3 |
| 3,599,527 | 8/1971 | Howells | 85/8.3 |

FOREIGN PATENT DOCUMENTS

| 76066 | 12/1917 | Fed. Rep. of Germany | 24/201 LP |
| 487623 | 4/1918 | France | 85/8.3 |
| 1369526 | 7/1964 | France | 85/8.3 |
| 678356 | 12/1964 | Italy | 85/8.1 |
| 123461 | 2/1919 | United Kingdom | 85/8.3 |
| 245501 | 6/1969 | U.S.S.R. | 85/8.3 |

Primary Examiner—Thomas J. Holko
Attorney, Agent, or Firm—Howard L. Rose

[57] ABSTRACT

A locking pin for retaining a body on a drilled shaft or stud has a first straight section the end of which passes through the aperture in the stud. Opposite the aforesaid end the straight section terminates in a long sweeping 270° section that straightens out into a leg of a U-shaped section having two legs lying astride the stud and lying at right angles to the straight section. The legs of the U-shaped member pass over the straight section and are angled down to contact the surface of the body to be retained on the stud whereby to provide a locking pin only two diameters of the wire high, having three lines of contact with the surface to prevent wobble and to prevent a line or rope from getting under the pin and lifting it off the stud. The pin is readily removed by placing a thumb nail under the base of the "u" or an opposed loop and lifting until the legs of the U are raised above the end of the stud.

7 Claims, 2 Drawing Figures

LOCKING PIN

BACKGROUND OF THE INVENTION

The present invention relates to locking pins and more particularly to locking pins for use with drilled shafts or studs.

Numerous locking pins for use with drilled shafts or studs are well known in the prior art and are commonly found on sailing craft. All of the prior art devices known to the inventor suffer from one or more of the following faults: they can flap about so that they are easily snagged by control lines or ropes or foul nearby moving parts which are in relative motion, they permit wobble of the body being held on the drilled shaft, they are difficult to apply and/or extract, they have raised portions which can injur persons or be snagged by a line and inadvertently extracted from the stud and/or require space below the member that goes through the hole in the shaft.

It is a primary object of the present invention to provide a locking pin that suffers from virtually none of the above defects.

It is an object of the present invention to provide a locking pin for use with drilled shafts or studs which is easily installed and removed but provides a low profile and is not readily snagged by ropes or control lines.

It is another object of the present invention to provide a locking pin for use with a drilled shaft or stud which permits three points of contact between the pin and the adjacent surface of a body to be retained on the stud and which prevents undesired rotation of the locking pin and if desired exert a spring force against the retained body.

The invention provides a locking pin fabricated from a single length of spring steel wire or material with similar characteristics of strength and resiliency. The length of wire commencing at a first end has a first straight section to be seated in the aperture in a stud or drilled shaft. The straight section ends in a 270° loop that terminates in a U-shaped member having two legs and a base. The two legs lie at right angles to the first straight section and astride the stud and generally in contact therewith. The base of the U-shaped member is spaced several diameters of the wire from the stud so that the length of wire from the end of the 270° loop and the base of the "U" is long enough to provide the resiliency necessary, even with stiff wire, to flex the metal and lift the legs of the U-shaped member above the end of the stud and extract the locking pin. The legs of the U-shaped section of the pin have a dihedral angle with the apex over the first straight section of the device whereby the base of the U and a loop formed at the end of the wire remote from the first end approach and may even contact the adjacent surface of the body to be retained.

A locking pin fabricated as above has a height of only two wire diameters and is not readily snagged, particularly since all ends or edges of the wire are adjacent the surface of the body or are protected by other members that are so adjacent.

BRIEF DESCRIPTION OF THE DRAWINGS

The above and still further objects, features and advantages of the present invention will become apparent upon consideration of the following detailed description of several specific embodiments thereof, especially when taken in conjunction with the accompanying drawings, wherein.

DETAILED DESCRIPTION OF THE INVENTION

Figures 1, 2:
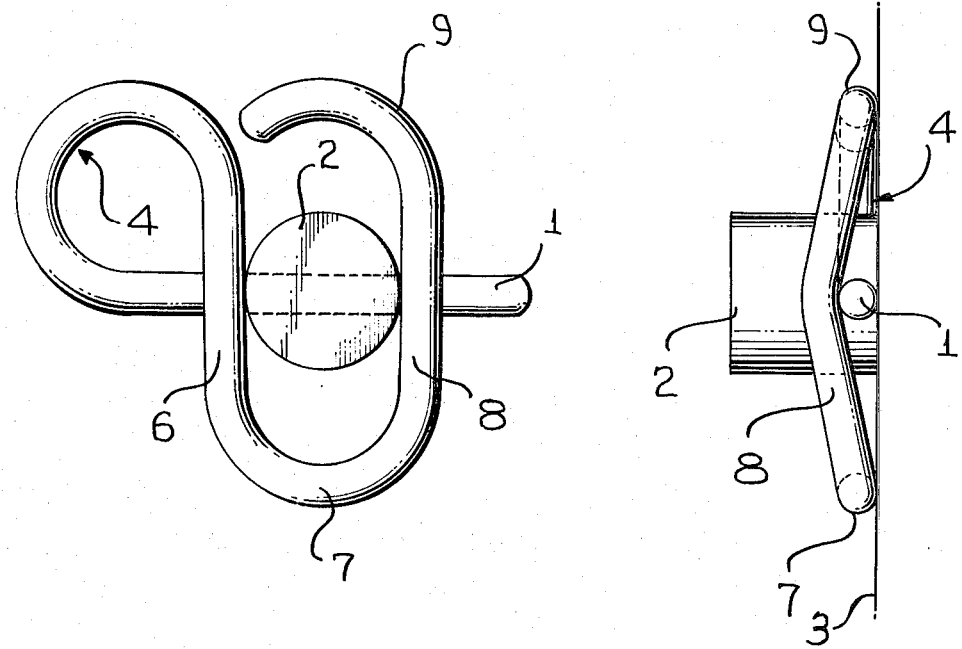
FIG. 1 is a top view of the locking pin of the present invention.
FIG. 2 is a side view in elevation of said locking pin.

Referring specifically to the Figures of the accompanying drawing, the locking pin is fabricated from a single length of wire of spring steel or related material.

The pin has a generally straight section 1 adapted to pass through an aperture in a drilled shaft or stud 2. The edge of the aperture in the stud 2 located remote from the end of the stud, is positioned very close to adjacent surface 3 of a body to be retained on the stud by the locking pin. Thus section 1 of the pin prevents substantial movement of the body defined by surface 3 towards the end of the stud 2, specifically, to the left in FIG. 2.

Referring specifically to FIG. 1, it is the right end of section 1 that is one terminus of the pin while the left end of the section terminates in a sweeping generally 270° section 4, that ends in a straight section 6 that crosses over section 1; i.e. section 1 lies between section 6 and surface 3.

The section 6 forms a first leg of a U-shaped member having a base 7 and a second leg 8. The distance between legs 6 and 8 is generally equal to the thickness, diameter in the case illustrated, of stud 2 and the legs lie astride the stud 2 contacting it to the left of, as illustrated in FIG. 2 and above, as illustrated in FIG. 1, of the straight section.

The base 7 is disposed several wire diameters from the stud 2 whereby a long length of stiff flexible wire, leg 4, is provided which in conjunction with the 270° section 4 constitutes a strong but highly resilient portion for purposes to be described subsequently.

The section 8 remote from base 7, terminates in a generally right angle loop 9. The legs or straight sections 6 and 8 have a bend (a dihedral angle) at the region of contact with section 1 such that the base 7 and loop 9 extend down, in FIG. 1; to the right in FIG. 2, into contact or into near contact with the surface 3.

The contact or near contact between, on the one hand sections 1, 7 and 9 of the locking pin and on the other hand, the surface 3, substantially prevents a line or rope from slipping under one of the sections 7 or 9, lifting the section 8 over the stud and permitting the pin to slip or be pulled out of the aperture in the stud 2. The problem of fouling by a rope or line is further reduced by the low profile of the locking pin, only two diameters of the wire. A further feature of the three point contact between the pin and surface 3 is the reduction of tendency of the body of surface 3 to rock on the stud.

The broad loops of sections 7 and 9 permits a thumb or finger nail to be readily inserted under the loops to lift them. Further, since two such loops are provided disposed at 180° to one another, the thumb or finger nails of either hand may be used, equally accomodating either right or left handed people or a given person from either side of the pin.

To remove the locking pin, a thumb or finger nail or suitable thin tool is inserted under the one of the loops 7 and 9 and the loop is lifted; the long length of the section 6 providing the necessary overall resiliency to permit leg 8 to be raised about stud 2. The pin is moved to the left as illustrated in FIG. 1 and is thus extracted.

Installation is achieved by inserting the projecting end of straight section 1 into the aperture and passing leg 8 over the stud 2 by placing either a tool or a thumb or finger nail under section 7 or 9 and lifting, followed by motion to the right (as viewed in FIG. 1).

The device of the invention thus provides a locking pin having a low profile, substantially preventing fouling by a rope or line, having three points of contact with a body to be retained and which may be readily removed without tools. The long legs 6 and 8 coupled with the dihedral further prevents a line slipping under the pin and also prevents rotation of the pin about section 1 which facilitates the anti-wobble feature and also removal of the pin.

It is believed apparent that the three point contact of pin and body is not essential particularly if the body is mounted with more than one such stud-locking pin arrangement. In such case the dihedral angle may be lessened but would normally not be eliminated so as to retain the anti-snagging feature and reduce rocking of the pin about section 1 when lifting the loops to extract the pin.

While I have described and illustrated specific embodiments of my invention, it will be clear that variations of the details of construction which are specifically illustrated and described may be resorted to without departing from the true spirit and scope of the invention as defined in the appended claims.

I claim:

1. A locking pin for use in retaining a body having surfaces on a drilled shaft or stud, said locking pin formed from a single length of resilient wire-like material having first and second ends, said locking pin having a loop of said wire-like material,
   a first generally straight section commencing at said first end and terminating in said loop, said loop forming a 270° turn back toward said first end, said loop extending to a first side of said straight section by several diameters of said wire,
   second and third generally straight sections,
   a curved section extending between one end of each of said second and third straight sections,
   a second end of said second straight section terminating in said loop remote from said first straight section;
   said second and third straight sections being generally parallel to one another and passing over and generally perpendicular to said first straight section on the same side thereof and being spaced apart from one another where passing over said first straight section by a distance generally equal to the width of the stud where the aperture passes therethrough.

2. A locking pin according to claim 1 wherein said second and third straight sections have a dihedral angle whereby said curved section and said second end of said length of wire-like material approach a common plane with said first generally straight section.

3. A locking pin according to claim 2 wherein said dihedral angle is such that said curved section and said second end contact a surface of the object to be retained when inserted in the stud.

4. A locking pin according to claim 1 wherein said second and third straight sections and said curved section define a U-shaped member.

5. A locking pin according to claim 1 wherein said loop and said curved section lie on opposite sides of said first straight section.

6. A locking pin according to claim 1 wherein said second and third straight sections extend for a length of several wire diameters beyond said first straight section and the stud.

7. A locking pin according to claim 1 wherein said loop and said curved section lie generally in a common plane perpendicular to the axis of the stud.

* * * * *